US012606061B2

(12) United States Patent
    Nagasawa

(10) Patent No.:  US 12,606,061 B2
(45) Date of Patent:      Apr. 21, 2026

(54) OCCUPANT KNEE SUPPORT DEVICE

(71) Applicant: SUBARU CORPORATION, Tokyo
    (JP)

(72) Inventor: Isamu Nagasawa, Tokyo (JP)

(73) Assignee: SUBARU CORPORATION, Tokyo
    (JP)

( * ) Notice: Subject to any disclaimer, the term of this
    patent is extended or adjusted under 35
    U.S.C. 154(b) by 174 days.

(21) Appl. No.: 18/524,432

(22) Filed: Nov. 30, 2023

(65) Prior Publication Data

US 2024/0253534 A1      Aug. 1, 2024

(30) Foreign Application Priority Data

Jan. 31, 2023    (JP) ................................. 2023-012646

(51) Int. Cl.
    *B60N 2/00*         (2006.01)
    *B60N 2/02*         (2006.01)
    *B60N 2/18*         (2006.01)
    *B60N 2/62*         (2006.01)
    *B60N 2/90*         (2018.01)

(52) U.S. Cl.
    CPC ......... *B60N 2/1821* (2013.01); *B60N 2/0028*
        (2023.08); *B60N 2/0278* (2023.08); *B60N*
        *2/1835* (2013.01); *B60N 2/62* (2013.01);
        *B60N 2/995* (2018.02); *B60N 2210/40*
        (2023.08)

(58) Field of Classification Search
    CPC ......... B60N 2/0028; B60N 2/995; B60N 2/62
    See application file for complete search history.

(56) References Cited

U.S. PATENT DOCUMENTS

|  |  |  |  |  |
|---|---|---|---|---|
| 9,499,072 | B2 * | 11/2016 | Yetukuri ................... | B60N 2/62 |
| 9,707,864 | B2 * | 7/2017 | Mizutani .................. | B60N 2/62 |
| 10,046,681 | B2 * | 8/2018 | Line ..................... | B60N 2/0284 |
| 10,479,250 | B2 * | 11/2019 | Hur .................... | B60N 2/02246 |
| 10,507,744 | B2 * | 12/2019 | Kim ......................... | B60N 2/34 |
| 10,946,779 | B2 * | 3/2021 | Mori ...................... | B60N 2/933 |
| 11,117,539 | B2 * | 9/2021 | Masuda ................. | B60N 3/066 |
| 2004/0034314 | A1 * | 2/2004 | Kobayashi .............. | B60N 2/62 |
|  |  |  |  | 601/5 |

(Continued)

FOREIGN PATENT DOCUMENTS

| CN | 111434523 | A | * | 7/2020 | ............. | B60N 2/427 |
|---|---|---|---|---|---|---|
| CN | 112477716 | A | * | 3/2021 | ............. | B60N 2/665 |
| CN | 112721759 | A | * | 4/2021 | ............. | B60N 2/07 |

(Continued)

*Primary Examiner* — Timothy J Brindley
(74) *Attorney, Agent, or Firm* — McGinn IP Law Group,
PLLC

(57)         ABSTRACT

An occupant knee support device provided in a vehicle
includes a knee outer side surface support member and a
knee lower surface support member. The knee outer side
surface support member is disposed in a side part of the seat
surface part in a stored state, protrudes forward and upward
beyond the seat surface part in a support state to support an
outer side surface of a knee of the occupant. The knee lower
surface support member is, in the stored state, provided in a
vicinity of a front end part of the seat surface part and
separated from a lower surface of the knee of the occupant.
The knee lower surface support member is configured to
support the lower surface of the knee of the occupant in the
supported state.

13 Claims, 7 Drawing Sheets

(56)    References Cited

U.S. PATENT DOCUMENTS

2016/0152160 A1 * 6/2016 Sakata ................ B60N 2/0278  
                       701/49  
2020/0391617 A1 * 12/2020 Lee .......................... B60N 2/22

FOREIGN PATENT DOCUMENTS

| | | | | | |
|---|---|---|---|---|---|
| CN | 110606009 | B | * | 4/2022 | ........... B60R 21/207 |
| DE | 102018108225 | A1 | * | 10/2018 | ............. B60N 2/206 |
| DE | 102018220465 | A1 | * | 5/2020 | ........... B60N 2/0028 |
| JP | S61-179039 | U | | 11/1986 | |
| JP | H10323258 | A | * | 12/1998 | ............. B60N 2/995 |
| JP | H11-48838 | A | | 2/1999 | |
| JP | 3551453 | B | | 8/2004 | |
| JP | 2010-105604 | A | | 5/2010 | |
| KR | 102053779 | B1 | * | 12/2019 | ............... B60N 2/02 |

\* cited by examiner

VEHICLE WIDTH DIRECTION
RIGHT SIDE

FORWARD

*FIG. 9A*
FORWARD
300
340
J4
330
320    J3    310
132
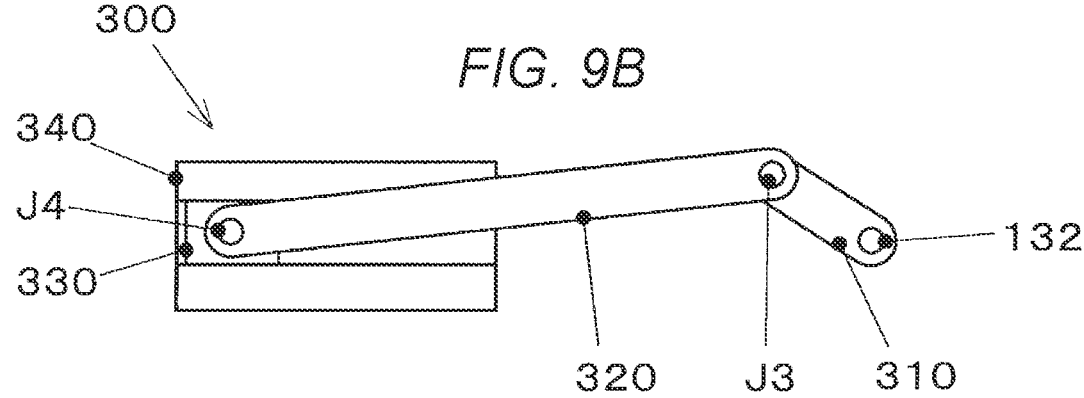
300
*FIG. 9B*
340
J4
330
320    J3    310
132
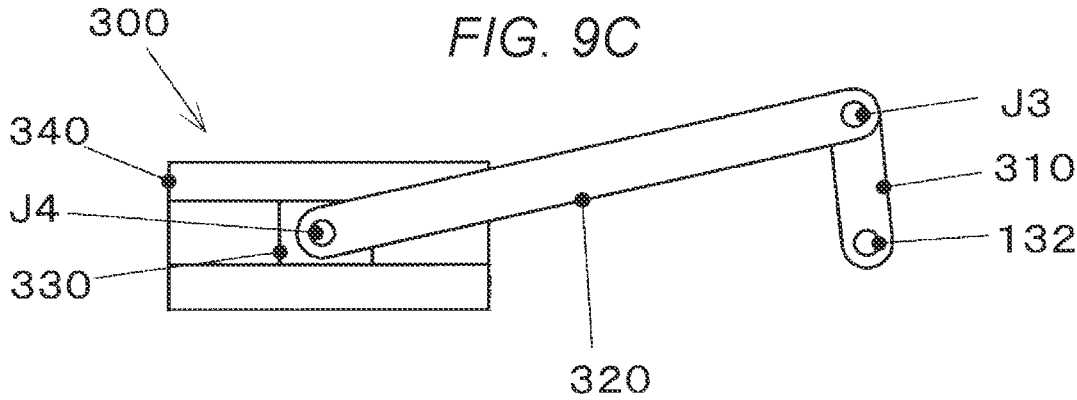
300
*FIG. 9C*
340
J4
330
320
J3
310
132

```
┌─────────────────┐              ┌─────────────────┐
│    ACTUATOR     │─────────────▶│  ACTUATOR UNIT  │
│  CONTROL UNIT   │              │                 │
└─────────────────┘              └─────────────────┘
       ▲
       │
   ┌────────┐
   │ SWITCH │
   └────────┘
```

150

130

160

OCCUPANT KNEE SUPPORT DEVICE

CROSS-REFERENCE TO RELATED APPLICATIONS

The present application claims priority Patent Application No. 2023-012646 filed on Jan. 31, 2023, the entire contents of which are hereby incorporated by reference.

BACKGROUND

The disclosure relates to an occupant knee support device that supports a knee of an occupant seated on a seat.

A technique related to a seat and the like provided to a vehicle such as an automobile includes a seat disclosed in Japanese Patent No. 3551453. The seat includes: a seat cushion; a seat back; an actuator that includes multiple variable parts including a large variable part with a large variation amount and a small variable part with a small variation amount, and changes a seat surface shape using the variable parts; a detector that detects information related to a vehicle state or information related to an operation by an occupant; a predictor that determines the state of the seat surface expected to be highly valued by the occupant; and a controller that changes the seat surface to the state expected to be highly valued by the occupant based on the determination by the predictor.

It is described that a cushion side support part protrudes in response to an increase in accelerator opening degree, acceleration G, and lateral G, to reliably support the body of the occupant in the lateral direction.

Japanese Unexamined Utility Model (Registration) Application Publication (JP-UM-A) No. S61-179039 discloses a vehicle seat apparatus in which a first thigh supporter and a second thigh supporter laterally disposed side by side in a front part of a seat surface part are provided to have distal ends that are pivotal downward and the thigh supporters are biased upward, to prevent the back of thighs from being strongly compressed by the thigh supporters of the seat, when various operation pedals are stepped on during the driving.

Japanese Unexamined Patent Application Publication (JP-A) No. H11-48838 discloses a seat in which a seat surface of the seat is split in the left-right direction into a first part and a second part, and an elevator is provided that moves up and down the first and the second parts individually, to prevent the upper thigh of the right leg from being lifted from the seat surface due to an accelerator operation regardless of the body size of the driver.

Japanese Unexamined Patent Application Publication (JP-A) No. 2010-105604 discloses a vehicle seat having both end portions, in the vehicle width direction of a seat cushion, provided with an occupant knee support device that supports the knee of an occupant seated on the seat cushion, to appropriately support the side surface of the knee of the occupant. The occupant knee support device includes a knee support portion that supports the side surface of the knee of the occupant, a support that supports the knee support portion, and a shaft portion that rotatably supports the support, and is provided with a storage device that stores the knee support portion inside the seat cushion.

SUMMARY

An aspect of the disclosure provides an occupant knee support device provided in a vehicle including a seat including a seat surface part to support a hip and a thigh of an occupant of the vehicle, and an accelerator pedal and a brake pedal disposed on a forward side of the seat surface part of the seat, the occupant knee support device including: a knee outer side surface support member being disposed in a side part of the seat surface part in a stored state, the knee outer side surface support member protruding forward and upward beyond the seat surface part in a support state to support an outer side surface of a knee of the occupant; a knee lower surface support member being, in the stored state, provided in a vicinity of a front end part of the seat surface part and separated from a lower surface of the knee of the occupant, the knee lower surface support member being configured to support the lower surface of the knee of the occupant in the supported state; and a driving unit configured to cause the knee outer side surface support member and the knee lower surface support member to transition from being in the stored state to being in the support state.

An aspect of the disclosure provides an occupant knee support device provided in a vehicle including a seat including a seat surface part to support a hip and a thigh of an occupant, and an accelerator pedal and a brake pedal disposed on a forward side of the seat surface part of the seat, the occupant knee support device including: a foot inclination detection unit configured to detect an inclination of a foot of the occupant with respect to a stepping surface of the accelerator pedal; and a driving unit configured to, in response to a detection of the inclination of the foot of the occupant with the foot inclination detection unit, cause at least one of the knee outer side surface support member and the knee lower surface support member transition from being in a stored state to being in a support state, the knee outer side surface support member being disposed in a side part of the seat surface part in the stored state, the knee outer side surface support member protruding forward and upward beyond the seat surface part in the support state to support an outer side surface of a knee of the occupant, the knee lower surface support member being, in the stored state, provided in a vicinity of a front end part of the seat surface part and separated from a lower surface of the knee of the occupant, the knee lower surface support member being configured to support the lower surface of the knee of the occupant in the supported state.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIGS. 8A to 8D are schematic views illustrating a configuration of a first link mechanism of the embodiment.

FIGS. 9A to 9C are schematic views illustrating a configuration of a second link mechanism of the embodiment.

DETAILED DESCRIPTION

When an elderly person or a person unaccustomed to driving drives an automobile for example, there have been cases where he or she degenerates into a dangerous state as a result of mistaking the accelerator pedal as the brake pedal or vice versa.

One cause of such pedal mistaking is inclination of a leg, with the knee tilting outward, of a person with low muscle strength who is weak in the leg.

The person with low muscle strength taking such a peculiar seated posture uses the thigh muscles for switching between the accelerator pedal and the brake pedal, which can be done using the shin and calf muscles by a person without such a handicap. When such a person is also weak in thigh muscles, it may be difficult for him or her to switch between the accelerator pedal and the brake pedal.

In view of this problem, it is desirable to provide an occupant knee support device capable of maintaining a seated posture suitable for pedal switching by a driver with low muscle strength.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

A first embodiment of an occupant knee support device to which the disclosure is applied is described below.

The occupant knee support device of the first embodiment is provided to a driver's seat of an automobile such as a passenger vehicle for example.

The driver's seat may be provided as the right front seat for example.

Figure 1:
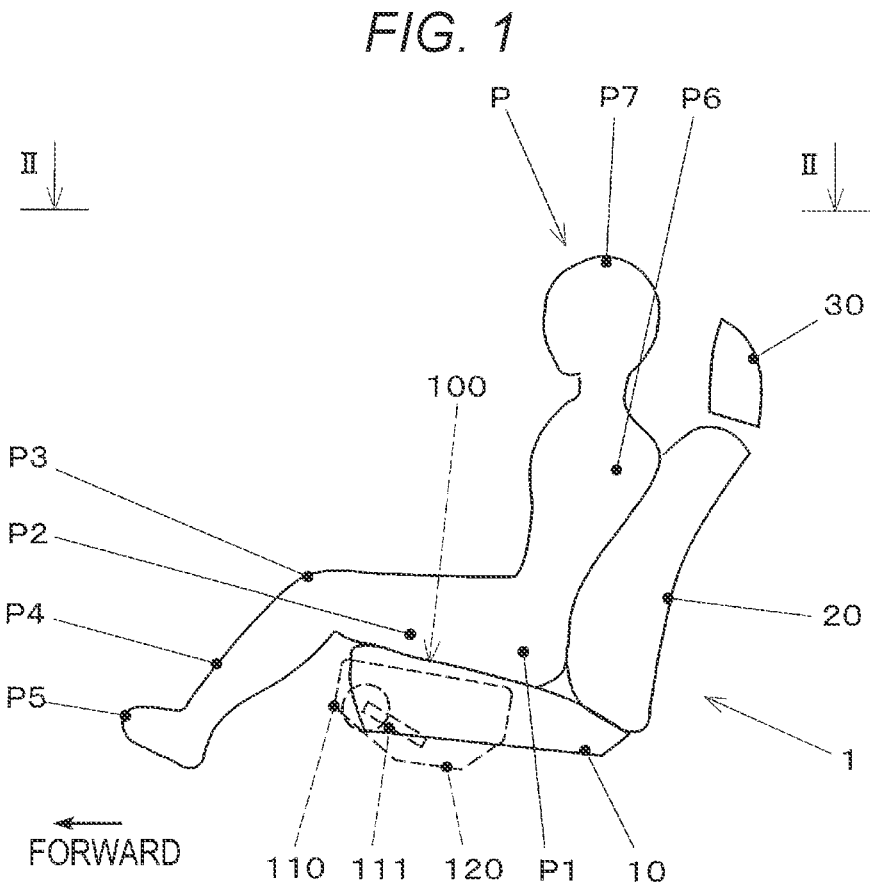
FIG. 1 is a side view illustrating an occupant seated on a vehicle seat including an embodiment of an occupant knee support device to which the disclosure is applied, and is a diagram illustrating a state where each support member is in a stored state.

FIG. 1 is a side view illustrating an occupant seated on a vehicle seat including the occupant knee support device of the embodiment, and is a diagram illustrating a state where each support member is in a stored state.

Figure 2:
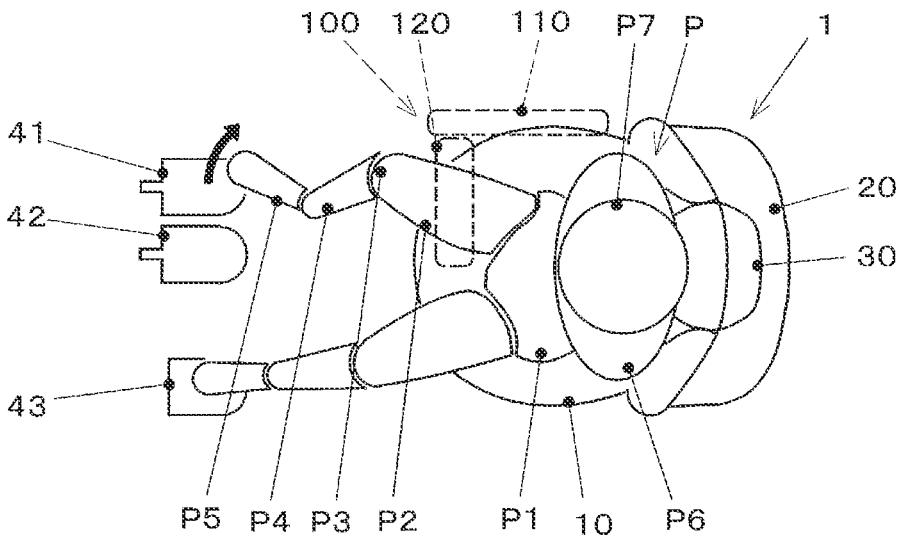
FIG. 2 is a diagram as viewed in a direction indicated by arrows II-II in FIG. 1.

FIG. 2 is a diagram as viewed in a direction indicated by arrows II-II in FIG. 1.

A seat 1 is for an occupant P who is the driver of a vehicle.

The seat 1 includes a seat cushion 10, a backrest 20, a headrest 30, and the like.

The seat cushion 10, the backrest 20, and the headrest 30 are formed by wrapping a flexible elastic material such as urethane foam for example, around a core in a frame shape made of a hard material such as metal for example.

The seat cushion 10, the backrest 20, and the headrest 30 have surfaces provided with a seat surface made of knitted fabrics, woven fabrics, natural leather, synthetic leather, or the like for example to cover the elastic material.

The seat cushion 10 includes a seat surface part to support a hip P1 and a thigh P2 of the occupant P.

A knee P3, a shin P4, and a foot P5 of the occupant P are disposed more on the forward side than the front end part of the seat cushion 10.

A rear end part (heel) of the foot P5 is placed on a floor surface not illustrated.

The heel serves as the fulcrum when the occupant P performs a stepping operation on an accelerator pedal 41 or the like.

The backrest 20 supports the hip P1 and an upper body P6 of the occupant P from the rear side.

The backrest 20 extends upward from the vicinity of the rear end part of the seat cushion 10.

The headrest 30 is a pillow-shaped part that supports a head P7 of the occupant P from the rear side.

The headrest 30 extends upward from the upper end part of the backrest 20.

As illustrated in FIG. 2, the accelerator pedal 41, a brake pedal 42, and a footrest 43 are provided in the order from the right side, near the floor surface on the forward side of the seat cushion 10.

The occupant P steps on the accelerator pedal 41 with his or her right foot P5 to perform an acceleration operation or the like, by adjusting the output from a traveling power source of the vehicle such as an engine or a motor for example.

The occupant P steps on the brake pedal 42 with his or her foot P5 to perform a deceleration operation or the like, by operating a brake device of the vehicle.

The occupant P places his or her left foot P5 on the footrest 43 to support the lower body and rest the left leg.

When the occupant P is a person with low muscle strength such as an elderly person, for example, the thigh P2, the shin P4, and the foot P5 may be inclined (pivot) in a direction in which the right knee P3 is swung outward (rightward as viewed from the occupant P) in response to an operation on the accelerator pedal 41 as illustrated in FIG. 2.

As a result, the sole surface (the contact surface with the accelerator pedal 41) of the foot P5 is inclined in a direction in which the toe side is tilted rightward from the heel side with respect to the accelerator pedal 41 compared with the normal orientation during the driving.

When this happens, the foot P5 and the shin P4 as well as the thigh P2 are moved relatively largely when switching between the accelerator pedal 41 and the brake pedal 42, resulting in a large burden for a person with low muscle strength and a high risk of stepping on the wrong pedal.

In view of this, in the first embodiment, an occupant knee support device 100 described below is employed for correcting the above-described posture that a person with low muscle strength often takes, and holding the right knee P3 at an appropriate position.

Figure 3:
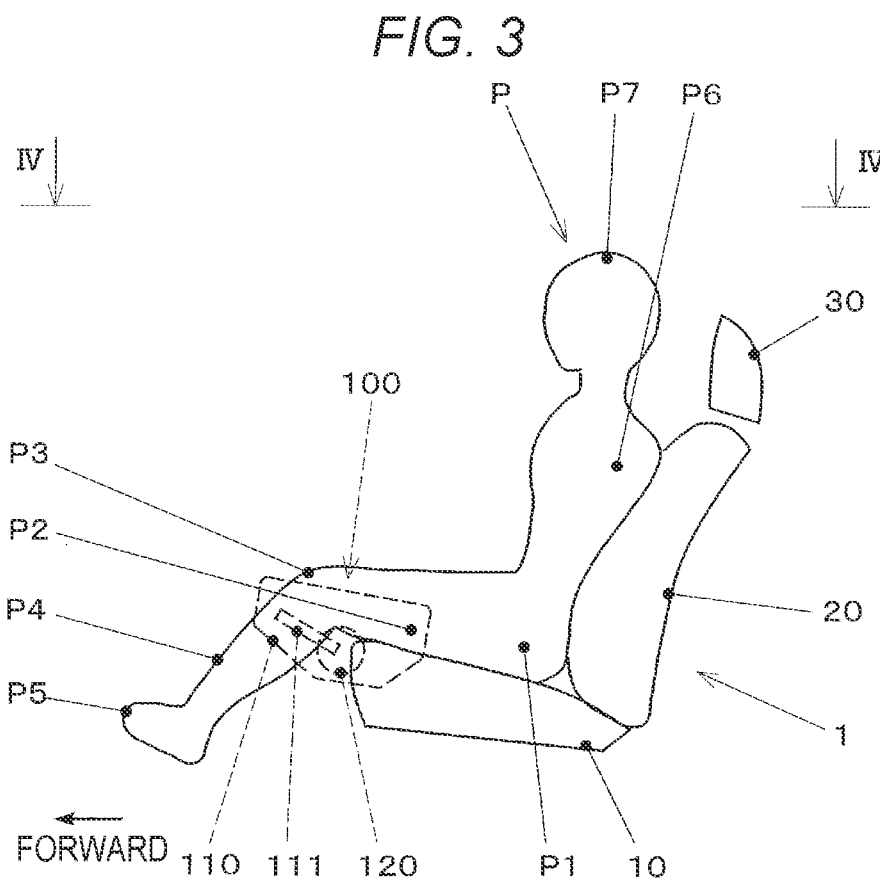
FIG. 3 is a side view illustrating the occupant seated on the vehicle seat including the occupant knee support device of the embodiment, and is a diagram illustrating a state where each support member is in a support state.

FIG. 3 is a side view illustrating the occupant seated on the vehicle seat including the occupant knee support device of the embodiment, and is a diagram illustrating a state where each support member is in a support state.

Figure 4:
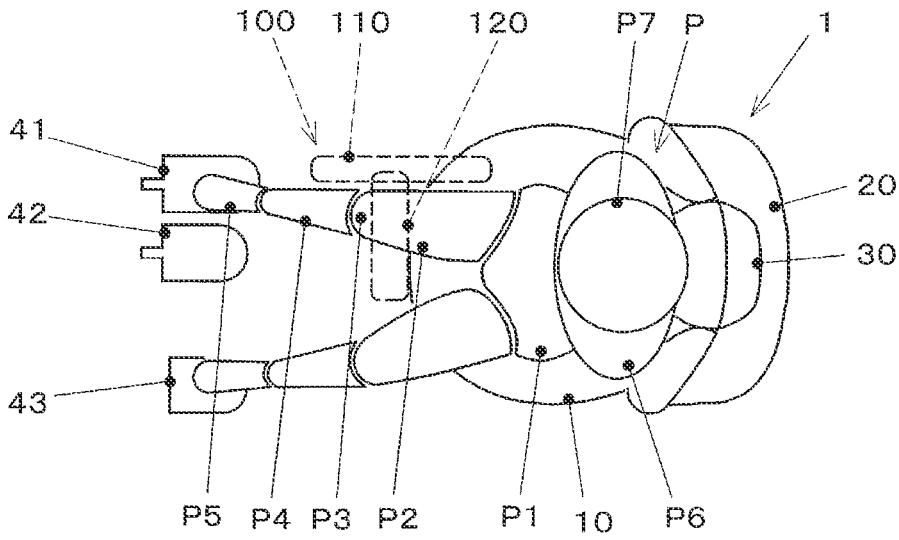
FIG. 4 is a diagram as viewed in a direction indicated by arrows IV-IV in FIG. 3.

FIG. 4 is a diagram as viewed in a direction indicated by arrows IV-IV in FIG. 3.

The occupant knee support device 100 includes a knee outer side surface support member 110, a knee lower surface support member 120, and the like.

The knee outer side surface support member 110 supports an outer side surface (right side surface) of the right knee P3 of the occupant P.

The knee outer side surface support member 110 is formed in a board shape extending in the forward-rearward direction and the upward-downward direction.

The knee outer side surface support member 110 can transition between the stored state and the support state.

The knee outer side surface support member 110 in the stored state illustrated in FIG. 1 and FIG. 2 is disposed at a side part of the seat cushion 10 along the right side surface of the seat cushion 10.

The knee outer side surface support member 110 in the support state illustrated in FIG. 3 and FIG. 4 extends upward beyond the upper part of the seat cushion 10 and extends forward beyond the front end part of the seat cushion 10.

The knee outer side surface support member 110 in the support state is in a state of overlapping the knee P3 of the occupant P in side view illustrated in FIG. 3.

The knee outer side surface support member 110 in the support state is in contact with the outer side surface of the knee P3 of the occupant P, to restrict the outward (rightward) displacement of the knee P3.

The knee outer side surface support member 110 has a rear part disposed above the side part of the seat cushion 10.

The knee lower surface support member 120 is provided in a front end part of the seat cushion 10 to support the lower surface of the right knee P3 of the occupant P.

For example, the knee lower surface support member 120 is formed in a cylindrical shape with the center axis extending in the left-right direction.

The knee lower surface support member 120 can transition between the stored state and the support state.

The knee lower surface support member 120 in the stored state illustrated in FIG. 1 and FIG. 2 is stored in the lower part of the front end part of the seat cushion 10.

The knee lower surface support member 120 in the stored state is separated from the knee P3 of the occupant P in the upward-downward direction.

The knee lower surface support member 120 in the support state illustrated in FIG. 3 and FIG. 4 is in contact with the lower surface of the knee P3 of the occupant P, while extending forward beyond the front end part of the seat cushion 10.

The knee outer side surface support member 110 is provided with a guide rail 111.

The guide rail 111 engages with a protruding end part of the knee lower surface support member 120, and linearly guides the knee lower surface support member 120 with respect to the knee outer side surface support member 110.

The guide rail 111 is disposed in an inclined manner to have the front end part disposed higher than the rear end part in side view of the knee outer side surface support member 110.

The knee lower surface support member 120 engages with the front end part of the guide rail 111 in the stored state, and engages with the rear end part of the guide rail 111 in the support state.

With such a configuration, the knee outer side surface support member 110 moves forward and upward, with respect to the knee lower surface support member 120, when transitioning from the stored state to the support state.

At this time, the knee lower surface support member 120 transitions from the stored state to the support state together with the knee outer side surface support member 110.

Figure 5:
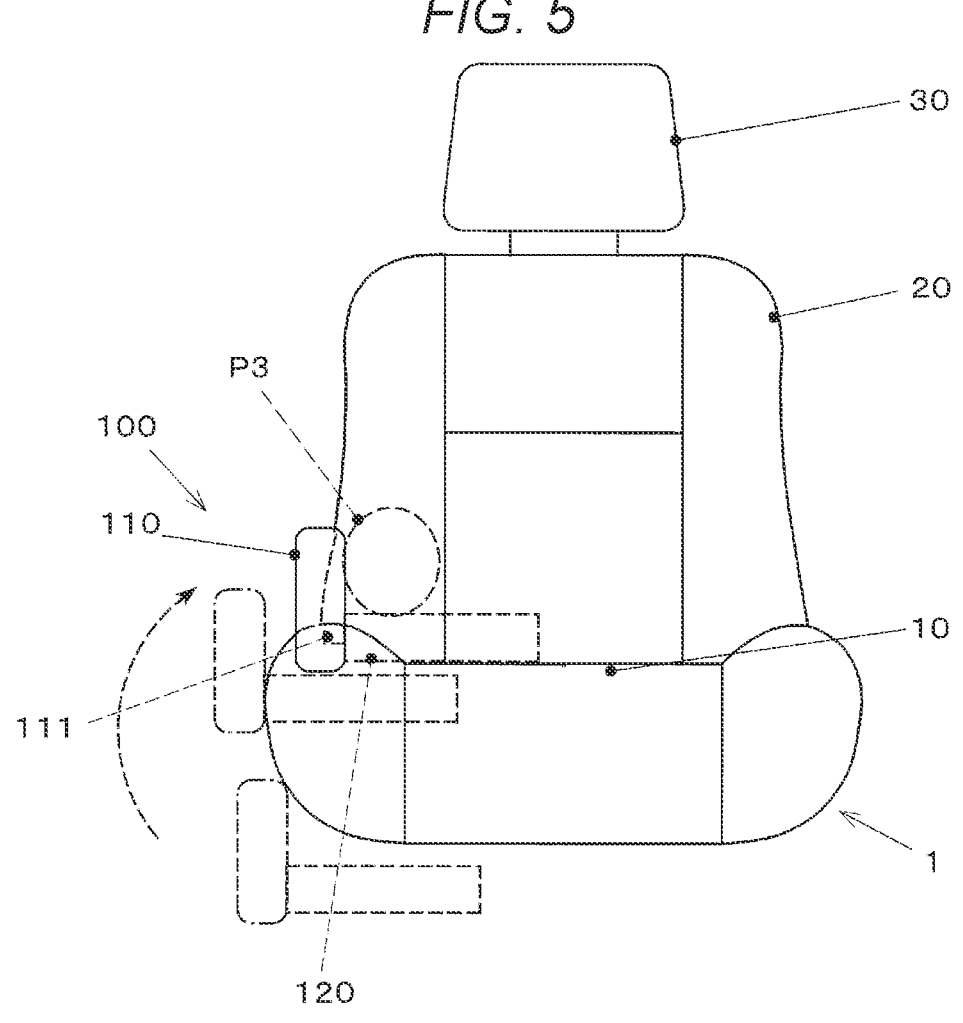
FIG. 5 is a diagram of a seat of the embodiment viewed from the forward side, and is a diagram schematically illustrating a movement trajectory of a knee outer side surface support member.

FIG. 5 is a diagram of the seat of the first embodiment viewed from the forward side, and is a diagram schematically illustrating a movement trajectory of the knee outer side surface support member.

As illustrated in FIG. 5, the knee outer side surface support member 110 transitions from the stored state to the support state, along an arch-shaped trajectory bulging outward in front view, to move in a circumventing manner to be disposed on the upper side of the side part of the seat cushion 10.

A detailed configuration of a driving mechanism and the like for achieving such a movement trajectory will be described in detail below.

Figure 6:
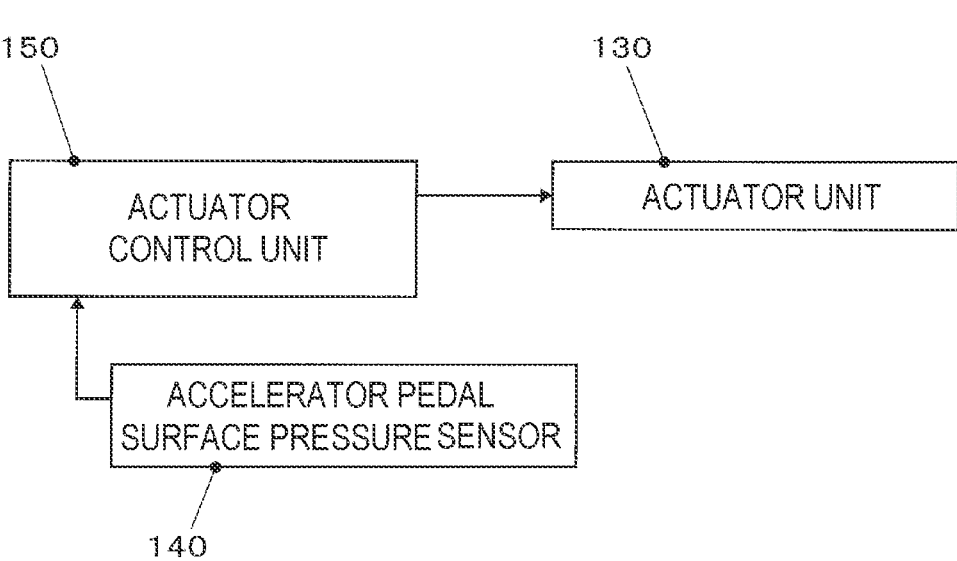
FIG. 6 is a diagram illustrating a configuration of a control system of the occupant knee support device of the embodiment.

FIG. 6 is a diagram illustrating a configuration of a control system of the occupant knee support device of the first embodiment.

The occupant knee support device 100 of the first embodiment further includes an actuator unit 130, an accelerator pedal surface pressure sensor 140, an actuator control unit 150, and the like.

The actuator unit 130 is a driving device (driving unit) that drives the knee outer side surface support member 110 and the knee lower surface support member 120 to cause the transition between the stored state and the support state.

The actuator unit 130 includes, for example, an electric motor such as a DC motor, a deceleration mechanism that decelerates the rotation of an output shaft of the electric motor, an interlocking mechanism that converts the rotation of an output shaft of the deceleration mechanism into a translational motion and the like, and the like.

The accelerator pedal surface pressure sensor 140 is a stepping force distribution sensor configured to detect the contact surface pressure distribution on a stepping surface part of the accelerator pedal 41.

For example, the accelerator pedal surface pressure sensor 140 includes multiple piezoelectric elements disposed in a matrix on the stepping surface part of the accelerator pedal 41.

The actuator control unit 150 is a control device that issues an operation instruction to the actuator unit 130 based on the output from the accelerator pedal surface pressure sensor 140, and causes the transition of the states of the knee outer side surface support member 110 and the knee lower surface support member 120 between the stored state and the support state.

The actuator control unit 150 determines, based on the output from the accelerator pedal surface pressure sensor 140, the inclination of the foot P5 of the occupant P with respect to the accelerator pedal 41 as described above (typically, the inclination (pivoting) of the foot P5 about the normal line on the stepping surface of the accelerator pedal 41).

The actuator control unit 150 cooperates with the accelerator pedal surface pressure sensor 140 to serve as a foot inclination detection unit of the disclosure.

When the foot P5 is determined to be inclined (pivoted) by a preset threshold or more about the normal line of the stepping surface part of the accelerator pedal 41 from a predetermined normal state, the right leg of the occupant P is determined to be inclined (rotated) in the direction in which the knee P3 is swung outward (rightward).

When the right leg of the occupant P is determined to be inclined, the actuator control unit 150 makes the actuator unit 130 cause the transition of the knee outer side surface support member 110 and the knee lower surface support member 120 from the stored position to the support position, to correct the inclination and maintain the appropriate position of the knee P3.

The knee outer side surface support member 110 and the knee lower surface support member 120 that have been transitioned to the support position are maintained in the support state until the driving cycle ends or the driver changes.

Figure 7:
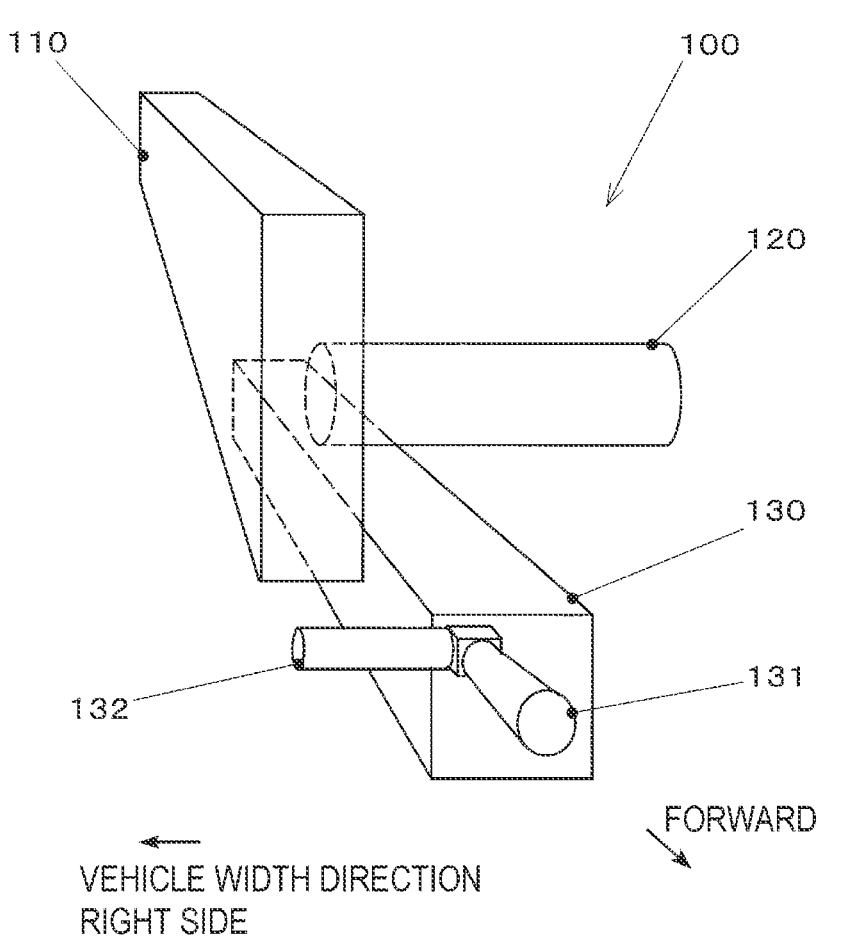
FIG. 7 is a diagram schematically illustrating a configuration of an actuator unit of the occupant knee support device of the embodiment.

FIG. 7 is a diagram schematically illustrating a configuration of the actuator unit of the first embodiment.

The actuator unit 130 is attached to a side part of a seat cushion frame not illustrated that is the core for the seat cushion 10 for example.

The actuator unit 130 in the stored state may be stored on the lower side and the inner side in the vehicle width direction of the knee outer side surface support member 110.

The actuator unit 130 includes a first output shaft 131 and a second output shaft 132.

The first output shaft 131 is a rotation shaft protruding forward from the front end part of the actuator unit 130.

The second output shaft 132 is a rotation shaft protruding rightward from the front end part of the actuator unit 130.

For example, the first output shaft 131 and the second output shaft 132 may be rotationally driven together by the same motor.

The first output shaft 131 drives the knee outer side surface support member 110 mainly in the upward-downward direction via a first link mechanism 200 described below.

The second output shaft 132 drives the knee outer side surface support member 110 mainly in the forward-rearward direction via a second link mechanism 300 described below.

FIGS. 8A to 8D are schematic views illustrating a configuration of the first link mechanism of the first embodiment.

FIGS. 8A to 8D illustrate states of the first link mechanism 200 as viewed from the forward side of the seat 1.

FIGS. 8A to 8D illustrate a sequence of the states of the knee outer side surface support member 110 transitioning from the stored state to the support state.

The first link mechanism 200 includes a crank 210, a rod 220, a guide pin 230, and the like.

The crank 210 is an arm-shaped member that has one end part attached to the first output shaft 131 and pivots about the first output shaft 131.

The crank 210 has the other end part coupled to the lower end part of the rod 220 via a joint J1 to be pivotal.

The rod 220 is an interlocking member having both end portions coupled to the crank 210 and the knee outer side surface support member 110 and transmits the motion of the crank 210 to the knee outer side surface support member 110.

Figures 8A, 8B, 8C, 8D:
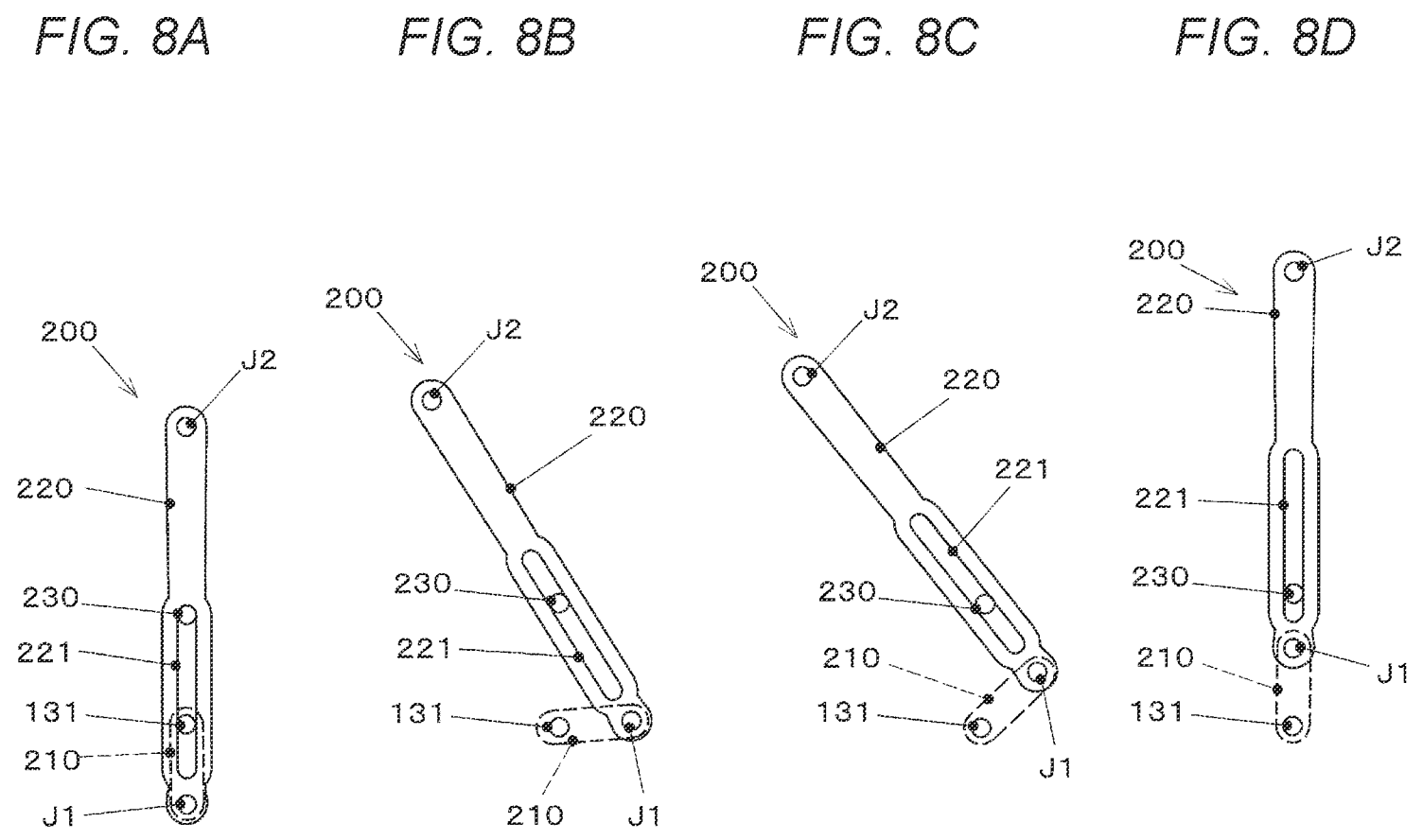

The rod 220 is disposed to have the longitudinal direction extending substantially along the vertical direction, when the knee outer side surface support member 110 is in the stored state (FIG. 8A) and in the support state (FIG. 8D).

The rod 220 has an end part (upper end part) on the side opposite to the joint J1, coupled to the knee outer side surface support member 110 via a joint J2 to be pivotal.

A long hole 221 is formed in an intermediate part of the rod 220 in the longitudinal direction.

The guide pin 230 is a shaft-shaped member that is fixed to a main body side component of the seat 1, such as the seat cushion frame, and is inserted in the long hole 221 for example.

The guide pin 230 and the long hole 221 guide the rod 220 to move the insertion portion of the guide pin 230 to the rod 220 along the longitudinal direction of the long hole 221.

In the state (stored state) illustrated in FIG. 8A, the joint J1 is located at the lower side of the first output shaft 131, and the guide pin 230 and the joint J2 are located above the first output shaft 131.

When the crank 210 pivots counterclockwise from the state illustrated in FIG. 8A, the joint J2 coupled to the knee outer side surface support member 110 moves up along an arch-shaped trajectory.

Thus, the knee outer side surface support member 110 can move to the upper side of the seat cushion 10 in a circumventing manner, that is, without interfering with the side part of the seat cushion 10.

In the state where the joint J1 is located at the upper side of the first output shaft 131 as illustrated in FIG. 8D, the transition to the support state is completed, and the upward movement of the knee outer side surface support member 110 ends.

In this state, the transition of the knee lower surface support member 120 that has moved upward together with the knee outer side surface support member 110 via the guide rail 111, to the support state is completed.

FIGS. 9A to 9C are schematic views illustrating a configuration of the second link mechanism of the first embodiment.

FIGS. 9A to 9C illustrate states of the second link mechanism 300 as viewed from the side (right side) of the seat 1.

FIGS. 9A to 9C illustrate a sequence of the states of the knee outer side surface support member 110 transitioning from the stored state to the support state.

The second link mechanism 300 includes a crank 310, a rod 320, a slider 330, a slide rail 340, and the like.

The crank 310 is an arm-shaped member that has one end part attached to the second output shaft 132 and pivots about the second output shaft 132.

The crank 310 has the other end part coupled to one end part of the rod 320 via a joint J3 to be pivotal.

The rod 320 is an interlocking member having both end portions coupled to the crank 310 and the slider 330 and transmits the motion of the crank 310 to the knee outer side surface support member 110.

The knee outer side surface support member 110 is attached to the rod 320.

The rod 320 is disposed to have the longitudinal direction extending along the forward-rearward direction, while the knee outer side surface support member 110 is in the stored state.

The rod 320 has the front end part coupled to the crank 310 via the joint J3 to be pivotal.

The rod 320 has a rear end part coupled to the slider 330 via a joint J4 to be pivotal.

The slider 330 is a member coupled to the rear end part of the rod 320 via the joint J4 and linearly guided by the slide rail 340 in the forward-rearward direction.

The slide rail 340 is fixed to a frame part of the seat cushion 10 and the like for example, and extends in the forward-rearward direction.

In the state (stored state) illustrated in FIG. 9A, the joint J3 is located on the rear side of the second output shaft 132, and the crank 310 and the rod 320 are linearly disposed along the forward-rearward direction.

When the crank 310 pivots clockwise from the state illustrated in FIG. 9A, the rod 320 to which the knee outer side surface support member 110 is attached moves forward while pivoting to have the front end part moved upward with respect to the rear end part.

At this time, the knee lower surface support member 120 moves upward together with the knee outer side surface support member 110.

In the state where the joint J3 is located at the upper side of the second output shaft 132 as illustrated in FIG. 9C, the transition to the support state is completed, and the forward movement of the knee outer side surface support member 110 ends.

The knee lower surface support member 120 is relatively retracted from the knee outer side surface support member 110 along the guide rail 111, and thus does not hinder the forward movement of the knee outer side surface support member 110.

The joints J1 to J4 may include a spherical bearing and the like for example, to prevent interference between operations of the first link mechanism 200 and the second link mechanism 300.

With the first embodiment described above, the following effects can be obtained.

(1) When the occupant P is a person with low muscle strength such as an elderly person for example, the outer side surface of the knee P3 is supported by the knee outer side surface support member 110, and the lower surface of the knee P3 is supported by the knee lower surface support member 120. Thus, the inclination of the thigh P2, the shin P4, and the foot P5 in a direction in which the knee P3 is swung outward can be prevented, and the knee P3 can be held at an appropriate position.

Thus, the switching between the accelerator pedal 41 and the brake pedal 42 can be performed mainly by the motion of the shin P4 and the foot P5. Thus, the load on the thigh P2 can be reduced, whereby the risk of stepping on the wrong pedal can be reduced.

When the driver is not a person with low muscle strength, the knee outer side surface support member 110 and the knee lower surface support member 120 are in the stored state so as not to be in the way of the driver getting on or off the vehicle, and not to impart the feeling of oppression. Thus, the user friendliness of the vehicle can be guaranteed.

(2) When the inclination of the foot P5 of the occupant P with respect to the accelerator pedal 41 is detected, the knee outer side surface support member 110 and the knee lower surface support member 120 automatically transition to the support state. Thus, user friendliness can be improved, and appropriate driving support can be provided for a person with low muscle strength.

With the inclination of the foot P5 detected using the accelerator pedal surface pressure sensor 140, the inclination of the foot P5 can be detected appropriately with a simple configuration, and the above-described effects can be obtained.

Second Embodiment

Next, a second embodiment of the occupant knee support device to which the disclosure is applied is described.

In the embodiments described below, the parts that are the same as those in the first embodiment are denoted by the same reference signs and will not be described. The description will be mainly given on differences.

Figures 10, 11:
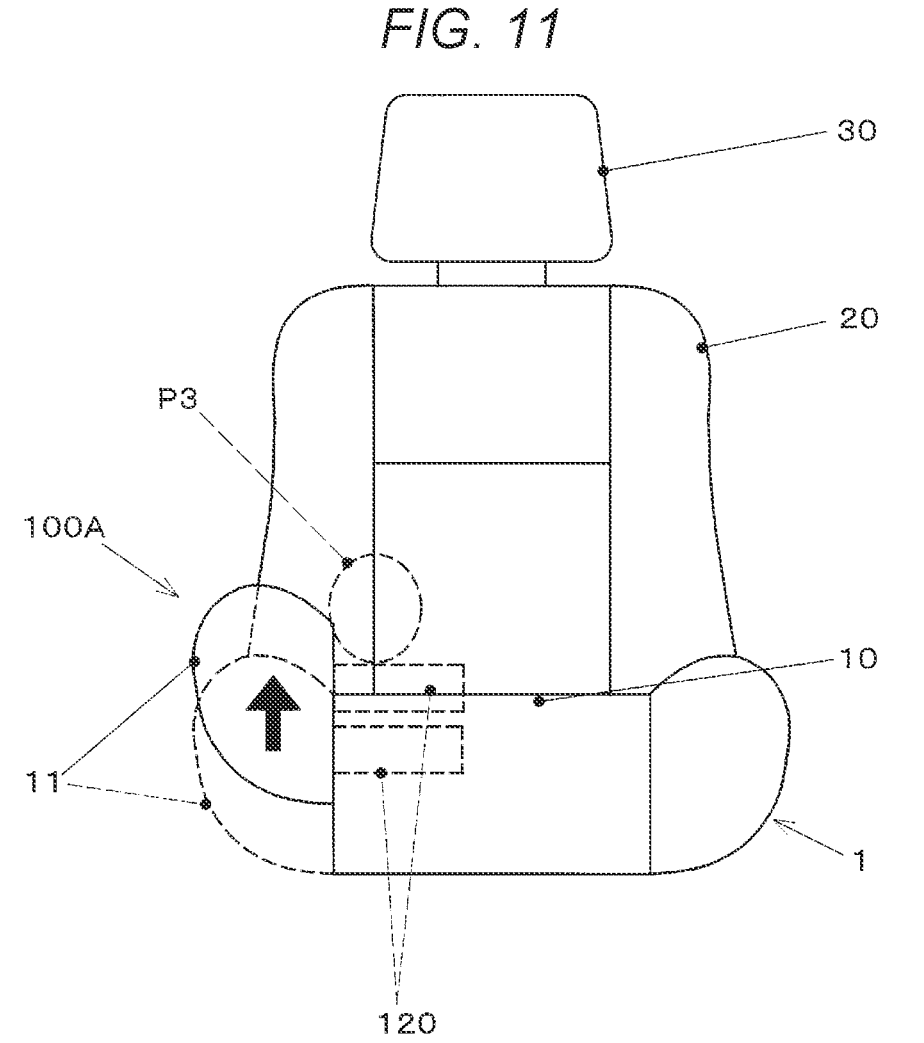
FIG. 10 is a diagram illustrating a configuration of a control system of an embodiment of the occupant knee support device to which the disclosure is applied.
FIG. 11 is a schematic front view of a seat provided with an embodiment of the occupant knee support device to which the disclosure is applied.

FIG. 10 is a diagram illustrating a configuration of a control system of the occupant knee support device of the second embodiment.

In the second embodiment, a switch 160 that is an operation unit operated by the occupant P is provided instead of the accelerator pedal surface pressure sensor 140 of the first embodiment.

The occupant P uses the switch 160 to input an operation of selecting between the stored state and the support state of the knee outer side surface support member 110 and the knee lower surface support member 120.

The actuator control unit 150 issues an operation instruction to the actuator unit 130 in response to the input from the switch 160, and makes the knee outer side surface support member 110 and the knee lower surface support member 120 transition between the stored state and the support state.

With the second embodiment described above, the states of the knee outer side surface support member 110 and the knee lower surface support member 120 can be switched as the occupant P has desired, in addition to the effects similar to those obtained by the first embodiment described above (excluding the effect as described in (2)).

Third Embodiment

Next, a third embodiment of the occupant knee support device to which the disclosure is applied is described.

FIG. 11 is a schematic front view of a seat provided with the occupant knee support device of the third embodiment.

In an occupant knee support device 100A of the third embodiment, a side part 11 of the seat cushion 10 is used as a knee outer side surface support member, instead of the knee outer side surface support member 110 of the first embodiment.

The side part 11 of the seat cushion 10 is moved upward by an actuator not illustrated from the stored state, which is a normal used state of the seat 1, to support the outer side surface of the knee P3 of the occupant P.

With the third embodiment, the number of parts can be reduced, and the user friendliness and the design of the vehicle can be improved since the knee outer side surface support member does not extend outward from the seat when the occupant knee support device is not in use, in addition to the effects similar to those provided by the first embodiment as described above.

MODIFIED EXAMPLES

The disclosure is not limited to the embodiments described above, and can be varied or modified in various ways. Such variations and modifications are included in the technical scope of the disclosure.

(1) The configurations of the occupant knee support device, the seat, and the vehicle are not limited to the embodiments described above, and can be changed as appropriate.

For example, configurations such as the shape, the structure, the material, the manufacturing method, the quantity, the displacement, and the way of movement for the transition between the stored state and the support state of the knee outer side surface support member and the knee lower surface support member are not limited to the configurations of the embodiments and can be changed as appropriate.

(2) The configuration of the driving mechanism (such as an actuator and a link mechanism) that makes the knee outer side surface support member and the knee lower surface support member transition between the stored state and the support state is not limited to the configurations of the embodiments, and can be changed as appropriate.

The configuration in which the knee outer side surface support member and the knee lower surface support member are interlocked and are driven by a single actuator as in the embodiment is not necessarily construed in a limiting sense, and the driving mechanism may be provided independently to each of the members.

(3) A method of detecting the inclination (pivoting) of the foot of the occupant with respect to the accelerator pedal is not limited to the configurations of the embodiments, and can be changed as appropriate.

An occupant knee support device according to an aspect of the disclosure is provided in a vehicle including a seat having a seat surface part to support a hip and a thigh of an occupant, and an accelerator pedal and a brake pedal disposed on a forward side of the seat surface part of the seat, and includes: a knee outer side surface support member configured to transition from a stored state of being provided in a side part of the seat surface part to a support state of extending forward and upward beyond the seat surface part to support an outer side surface of a knee of the occupant; a knee lower surface support member provided in vicinity of a front end part of the seat surface part and configured to transition from a stored state of being separated from a lower surface of the knee of the occupant to a support state of supporting the lower surface of the knee of the occupant; and a driving unit configured to make the knee outer side surface support member and the knee lower surface support member transition from the stored state to the support state.

With this configuration, when the occupant is a person with low muscle strength, the outer side surface of the knee is supported by the knee outer side surface support member, and the lower surface of the knee is supported by the knee lower surface support member. Thus, the inclination of the leg in a direction in which the knee is swung outward is prevented, and the knee can be held at an appropriate position.

Thus, the switching between the accelerator pedal and the brake pedal can be performed mainly by the motion of the shin and the foot. Thus, the load on the thigh can be reduced, whereby the risk of stepping on the wrong pedal can be reduced.

When the driver is not a person with low muscle strength, the knee outer side surface support member and the knee lower surface support member are in the stored state so as not to be in the way of the driver getting on or off the vehicle, and not to impart the feeling of oppression. Thus, the user friendliness of the vehicle can be guaranteed.

In the disclosure, a foot inclination detection unit configured to detect an inclination of a foot of the occupant with respect to a stepping surface of the accelerator pedal may be provided, and the driving unit may make the knee outer side surface support member and the knee lower surface support member transition from the stored state to the support state when the inclination of the foot of the occupant is detected.

With this configuration, when the inclination of the foot of the occupant with respect to the accelerator pedal is detected, the knee outer side surface support member and the knee lower surface support member automatically transition to the support state. Thus, user friendliness can be improved, and appropriate driving support can be provided for a person with low muscle strength.

Thus, the foot inclination detection unit can include a stepping force distribution sensor configured to detect the stepping force distribution on the stepping surface of the accelerator pedal.

Accordingly, the inclination of the foot can be appropriately detected with a simple configuration, and the above-described effects can be obtained.

In the disclosure, an operation unit operated by the occupant to operate the knee outer side surface support member and the knee lower surface support member may be provided, and the driving unit may be configured to make the knee outer side surface support member and the knee lower surface support member transition from the stored state to the support state when the operation is input using the operation unit.

With this configuration, the states of the knee outer side surface support member and the knee lower surface support member can be switched as the occupant has desired.

To solve the above-described problems, an occupant knee support device according to another aspect of the disclosure is provided in a vehicle including a seat having a seat surface part to support a hip and a thigh of an occupant, and an accelerator pedal and a brake pedal disposed on a forward side of the seat surface part of the seat, and includes: a foot inclination detection unit configured to detect an inclination of a foot of the occupant with respect to a stepping surface of the accelerator pedal; and a driving unit configured to make, when the inclination of the foot of the occupant is detected, one or more of a knee outer side surface support member configured to transition from a stored state of being provided in a side part of the seat surface part to a support state of extending forward and upward beyond the seat surface part to support an outer side surface of a knee of the occupant and a knee lower surface support member provided in vicinity of a front end part of the seat surface part and configured to transition from a stored state of being separated from a lower surface of a thigh of the occupant to a support state of supporting a lower surface of the knee of the occupant, transition from the stored state to the support state.

With this configuration, when the inclination of the foot of the occupant with respect to the accelerator pedal is detected, one or more of the knee outer side surface support member and the knee lower surface support member automatically transitions to the support state. Thus, the inclination of the leg in a direction in which the knee is swung outward is prevented, and the knee can be held at an appropriate position.

As described above, according to the disclosure, it is possible to provide an occupant knee support device capable of maintaining a seated posture suitable for pedal switching by a driver with low muscle strength.

The actuator control unit 150 illustrated in FIG. 6 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the actuator control unit 150 illustrated in FIG. 6. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the actuator control unit 150 illustrated in FIG. 6.

The invention claimed is:

1. An occupant knee support device provided in a vehicle comprising a seat comprising a seat surface part to support a hip and a thigh of an occupant of the vehicle, and an accelerator pedal and a brake pedal disposed on a forward side of the seat surface part of the seat, the occupant knee support device comprising:

a knee outer side surface support member being disposed in a side part of the seat surface part in a stored state, the knee outer side surface support member protruding forward and upward beyond the seat surface part in a support state to support an outer side surface of a knee of the occupant;

a knee lower surface support member being, in the stored state, provided in a vicinity of a front end part of the seat surface part and separated from a lower surface of the knee of the occupant, the knee lower surface support member being configured to support the lower surface of the knee of the occupant in the supported state;

a foot inclination detection unit configured to detect a pivoting of a foot of the occupant about a normal line of a stepping surface of the accelerator pedal; and a driving unit configured to, in response to a detection of the pivoting of the foot, cause the knee outer side surface support member and the knee lower surface support member to transition from being in the stored state to being in the support state.

2. The occupant knee support device according to claim 1, wherein the driving unit is configured to, when an angle of the pivoting of the foot is equal to or more than a predetermined threshold, cause the knee outer side surface support member and the knee lower surface support member to transition from being in the stored state to being in the support state.

3. The occupant knee support device according to claim 2, wherein the foot inclination detection unit comprises a stepping force distribution sensor configured to detect a stepping force distribution on the stepping surface of the accelerator pedal.

4. The occupant knee support device according to claim 1, further comprising an operation unit to be operated by the occupant to operate the knee outer side surface support member and the knee lower surface support member, wherein the driving unit is configured to, when the operation is input using the operation unit, cause the knee outer side surface support member and the knee lower surface support member to transition from being in the stored state to being in the support state.

5. An occupant knee support device provided in a vehicle comprising a seat comprising a seat surface part to support a hip and a thigh of an occupant, and an accelerator pedal and a brake pedal disposed on a forward side of the seat surface part of the seat, the occupant knee support device comprising:

a foot inclination detection unit configured to detect a pivoting of a foot of the occupant about a normal line of a stepping surface of the accelerator pedal; and a driving unit configured to, in response to a detection of the pivoting of the foot of the occupant with the foot inclination detection unit, cause at least one of a knee outer side surface support member and a knee lower surface support member transition from being in a stored state to being in a support state, the knee outer side surface support member being disposed in a side part of the seat surface part in the stored state, the knee outer side surface support member protruding forward and upward beyond the seat surface part in the support state to support an outer side surface of a knee of the occupant, the knee lower surface support member being, in the stored state, provided in a vicinity of a front end part of the seat surface part and separated from a lower surface of the knee of the occupant, the knee lower surface support member being configured to support the lower surface of the knee of the occupant in the supported state.

6. The occupant knee support device according to claim 2, wherein the angle of the pivoting of the foot indicates an inclination angle at which the foot tilts toward a right side of the vehicle from a state where the foot is in a predetermined position relative to the stepping surface of the accelerator pedal.

7. The occupant knee support device according to claim 5, wherein the driving unit is further configured to cause the knee outer side surface support member and the knee lower surface support member to transition from being in the stored state to being in the support state when an angle of the pivoting of the foot is equal to or more than a predetermined threshold, and wherein the angle of the pivoting of the foot indicates an inclination angle at which the foot tilts toward a right side of the vehicle from a state where the foot is in a predetermined position relative to the stepping surface of the accelerator pedal.

8. The occupant knee support device according to claim 5, wherein the driving unit is further configured to cause the knee outer side surface support member to transition from being in the stored state to being in the support state when an angle of the pivoting of the foot is equal to or more than a predetermined threshold, and wherein the angle of the pivoting of the foot indicates an inclination angle at which the foot tilts toward a right side of the vehicle from a state where the foot is in a predetermined position relative to the stepping surface of the accelerator pedal.

9. The occupant knee support device according to claim 5, wherein the driving unit is further configured to cause the knee lower surface support member to transition from being in the stored state to being in the support state when an angle of the pivoting of the foot is equal to or more than a predetermined threshold, and wherein the angle of the pivoting of the foot indicates an inclination angle at which the foot tilts toward a right side of the vehicle from a state where the foot is in a predetermined position relative to the stepping surface of the accelerator pedal.

10. The occupant knee support device according to claim 6, wherein the foot inclination detection unit comprises a stepping force distribution sensor configured to detect a stepping force distribution on the stepping surface of the accelerator pedal.

11. The occupant knee support device according to claim 7, wherein the foot inclination detection unit comprises a stepping force distribution sensor configured to detect a stepping force distribution on the stepping surface of the accelerator pedal.

12. The occupant knee support device according to claim 8, wherein the foot inclination detection unit comprises a stepping force distribution sensor configured to detect a stepping force distribution on the stepping surface of the accelerator pedal.

13. The occupant knee support device according to claim 9, wherein the foot inclination detection unit comprises a stepping force distribution sensor configured to detect a stepping force distribution on the stepping surface of the accelerator pedal.

\* \* \* \* \*